J. L. HERMAN.
CUTTING TOOL.
APPLICATION FILED OCT. 3, 1917.
1,281,004.
Patented Oct. 8, 1918.
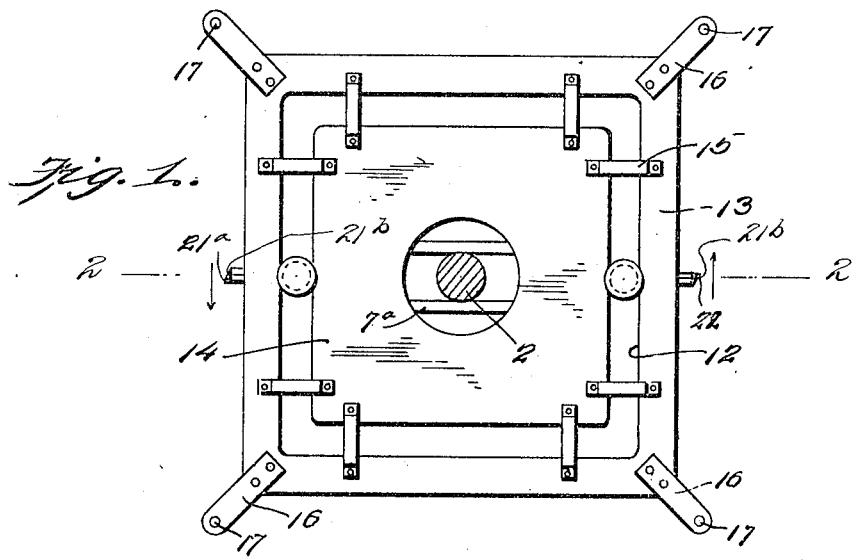
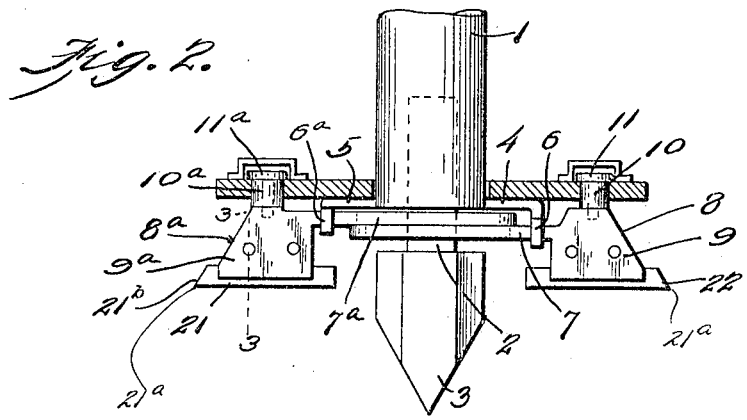
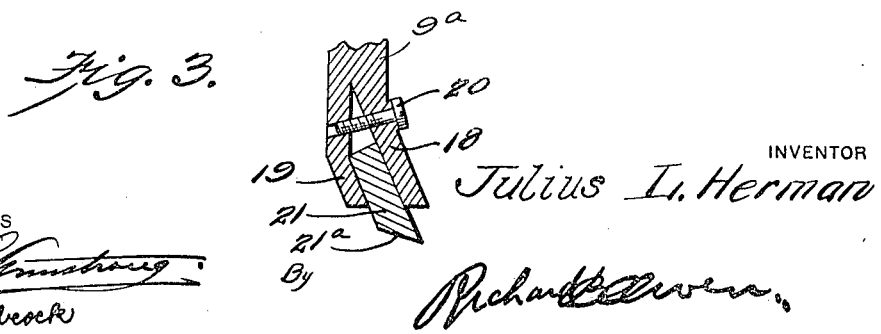
WITNESSES
INVENTOR
Julius L. Herman
By
ATTORNEY

UNITED STATES PATENT OFFICE.

JULIUS L. HERMAN, OF TOLEDO, OHIO.

CUTTING-TOOL.

1,281,004.         Specification of Letters Patent.    Patented Oct. 8, 1918.

Application filed October 3, 1917. Serial No. 194,562.

*To all whom it may concern:*

Be it known that I, JULIUS L. HERMAN, a citizen of the United States, residing at Toledo, in the county of Lucas and State of Ohio, have invented certain new and useful Improvements in Cutting-Tools, of which the following is a specification.

This invention relates to cutting tools, and more particularly to a tool for cutting recesses and openings of irregular or polygonal outline.

One of the main objects of the invention is to provide a tool of simple construction and operation specially adapted for cutting polygonal openings and recesses. A further object is to provide a tool having a rotatable supporting member and tool holding devices carried thereby so as to rotate with said supporting member, means being provided for reciprocating said holding members when the supporting member is rotated. A further object is to provide a rotatable shaft and oppositely reciprocating tool holding members carried by the shaft so as to rotate therewith, a frame being provided about the shaft and connected to the tool holding members so as to cause them to move through a polygonal path of travel when the shaft is rotated. Further objects will appear from the detailed description.

In the drawings:

Figure 1 is a top plan view of a cutting tool constructed in accordance with my invention;

Fig. 2 is a section taken substantially on line 2—2 of Fig. 1;

Fig. 3 is a section on line 3—3 of Fig. 2.

The shaft 1, which may be rotated by any suitable means, is centrally bored and threaded at its lower end to receive a reduced threaded neck 2 of a guide and centering member 3. The shaft is provided, at its lower end, with a radially extending and diametrically opposite arms 4 and 5 formed integral therewith. The outer end of arm 4 is turned down at right angles and is enlarged to provide a supporting and guide head 6 which slidably receives the shank 7 of a tool holding member 8 having the head 9 formed integral with, and at the outer end of, shank 7. A tool holding member $8^a$ is provided at the opposite side of shaft 1 and has its shank $7^a$ slidably operative through a guide head $6^a$ at the outer end of arm 5. The shank $7^a$ of member $8^a$ is in sliding contact with the upper face of shank 7 of member 8, and these two shanks are centrally slotted to receive the neck 2 of member 3. By this means, the two tool holding members are slidably connected to the neck of the member 3 so as to be reciprocatable radially of the tool, while being connected to the shaft 1 so as to rotate therewith.

A guide roller 10 is mounted on the upper end of tool holding head 9 of a member 8 by a headed screw 11 inserted through the same, a similar roller $10^a$ being mounted on head $9^a$ of member $8^a$ by means of a screw $11^a$. The rollers 10 and $10^a$ are operated in a guide slot 12 formed between a rectangular frame 13 and an inner block 14 mounted in concentric spaced relation thereto, these two members being secured in proper relative position by the U-braces 15 which are secured to the block and the frame. These braces span the guide slot 12 and are of sufficient height and width to permit easy passage of the heads of screws 11 and $11^a$ through the same, the heads of these screws extending a short distance beyond either side of the guide slot 12, as shown. Brackets 16 are secured to the corners of frame 13 and project outwardly therefrom. Each of these brackets is provided, adjacent its outer end, with an opening 17 which is adapted to receive a pin or the equivalent driven into a piece of material which it is desired to operate upon. By this means, the frame, and the concentric inner block 14, are secured against rotation so that, when the shaft 1 is rotated the tool holding members will be reciprocated so as to cause the cutting tools carried thereby to move in a polygonal path of travel.

The tool holding head $9^a$ of member $8^a$ is divided at its lower end to provide the spaced resilient holding jaws 18 and 19. These jaws are forced toward each other by set screws 20 so as to tightly grip and hold the cutting tool 21. As will be noted from Figs. 1 and 3 of the drawings, the gripping jaws 18 and 19 are disposed at an angle to the body of head $9^a$, being directed in the direction of movement of the cutting tools when the device is in operation. The under-face of cutting tool 21 is beveled downwardly and forwardly in the direction of movement of the tool, as at $21^a$, and the outer end of this tool is inclined downwardly and outwardly as at $21^b$. A similar cutting tool 22 is secured in head 9 of member 8, this tool being also directed in the direction of travel of the tool when in use.

In using this cutting device, a suitable recess or hole is bored in the piece of material to be operated upon, this recess or hole corresponding in diameter to the diameter of member 3. After this has been done, member 3 is inserted into the bore so as to bring the cutting edges of the tools 21 and 22 into engagement with the upper surface of the material, after which suitable securing and guide pins, or their equivalent, may be passed through the openings 17 of brackets 16 and driven into the material so as to secure the frame 13 against rotation. After this has been done, the shaft 1 may be rotated by any suitable means. During the rotation of the shaft, the cutting tools will be caused to travel through a polygonal path so as to cut, in this case, a groove or channel of substantially square outline about the member 3. If it is desired to cut an opening entirely through the material being operated upon, the shaft 1 will be rotated until this has been effected. On the other hand, if it is desired merely to form a sectional recess in the material, the channel may be cut to the desired depth after which the block of material surrounded by this channel may be readily removed by means of a chisel or other suitable instrument. By making the heads of the members for carrying the cutting tools of different lengths, the depth to which the channel or slot may be cut can be varied as desired. Also, while I have illustrated a device for cutting a square recess or opening, it will be evident that by varying the outline of the guide slot, an opening or recess of any desired configuration may be produced. It will be evident that there may be slight changes made in the construction and arrangement of the different parts of my invention without departing from the field and scope of the same, and I intend to include all such variations, as fall within the scope of the appended claims, in this application in which a preferred form only of my invention is disclosed.

What I claim is:

1. In cutting tools, a shaft having radially extending arms provided at their outer ends with guide members, tool holding members comprising a shank and a tool holding head at the outer end thereof, the shanks of said members being slidably connected to said shaft and slidable through the guide members of said arms, a guide frame mounted about said shaft, and connections between said frame and the tool holding members for causing said members to move through a polygonal path of travel when the shaft is rotated.

2. In cutting tools, a shaft having radially extending arms provided at their outer ends with guide members, tool holding members provided with tool holding heads at their outer ends and having inwardly extending shanks which are longitudinally slotted and are slidably connected to said shaft so as to guide the said holding members during movement radially of the shaft, a guide frame mounted about said shaft, and connections between said frame and the tool holding members for causing said members to move through a substantially polygonal path of travel when the shaft is rotated.

3. In cutting tools, a shaft having radially extending arms provided at their outer ends with guide heads, tool holding members having tool holding heads at their outer ends and provided with rearwardly projecting shanks slidable through the guide heads of said guide members, a centering member provided with a reduced neck secured in the lower end of said shaft in concentric relation thereto, the inner portions of the shanks of said tool holding members being expanded and longitudinally slotted so as to fit snugly about the neck of the centering member and guide the tool holders during movement radially of the shaft, the shafts of said tool holders being positioned in superposed relation about the neck of said centering member and closely adjacent the lower end of the shaft, a guide frame mounted about said shaft, and connections between said frame and the tool holding members for causing said members to move through a substantially polygonal path of travel when the shaft is rotated.

In testimony whereof I affix my signature in presence of two witnesses.

JULIUS L. HERMAN.

Witnesses:
WILLIAM G. NOBLE,
FRANK R. ULTSCH.

Copies of this patent may be obtained for five cents each, by addressing the "Commissioner of Patents, Washington, D. C."